A. P. WILSON.
METHOD OF MAKING CUTTERS FOR PENCIL SHARPENERS.
APPLICATION FILED APR. 21, 1919.

1,383,047.

Patented June 28, 1921.

Inventor:
Allen P. Wilson
by attorneys

A. P. WILSON.
METHOD OF MAKING CUTTERS FOR PENCIL SHARPENERS.
APPLICATION FILED APR. 21, 1919.

1,383,047. Patented June 28, 1921.
2 SHEETS—SHEET 2.

Inventor:
Allen P. Wilson
by attorneys

UNITED STATES PATENT OFFICE.

ALLEN P. WILSON, OF WALTHAM, MASSACHUSETTS, ASSIGNOR TO BOSTON PENCIL POINTER COMPANY, OF WALTHAM, MASSACHUSETTS, A CORPORATION OF MASSACHUSETTS.

METHOD OF MAKING CUTTERS FOR PENCIL-SHARPENERS.

1,383,047. Specification of Letters Patent. Patented June 28, 1921.

Application filed April 21, 1919. Serial No. 291,523.

*To all whom it may concern:*

Be it known that I, ALLEN P. WILSON, a citizen of the United States, and resident of Waltham, in the county of Middlesex and State of Massachusetts, have invented a new and useful Improvement in Methods of Making Cutters for Pencil-Sharpeners, of which the following is a specification.

This invention relates to improvements in the method of making cutters for pencil sharpeners, with the object in view of providing a hollow cutter which is developed from sheet metal.

Another object is to provide a cutter of this character in which a sheet metal blank is struck up to produce one or more pencil sharpening blades and the blank then being curved and its side edges united to form a tube having the sharpening blade or blades arranged exteriorly thereon.

Practical embodiments of my invention are represented in the accompanying drawings in which, Figure 1 represents a plan view of a piece of sheet metal from which a blank for one form of my improved cutter is taken.

Figure 1:
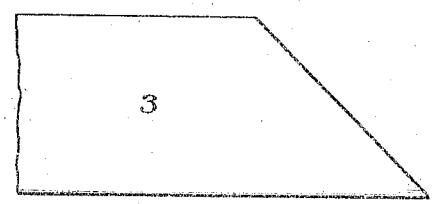
Figure 2:
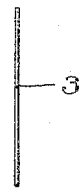
Fig. 2 represents an edge view of the same.
Figure 3:
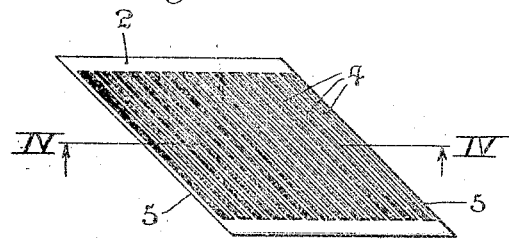
Fig. 3 represents a plan view of the blank struck up to produce the pencil sharpening blades thereon.
Figure 5:
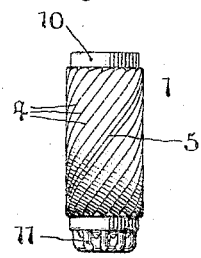
Fig. 5 represents a side view of the cutter, the pencil sharpening blades being shown arranged spirally and exteriorly thereon, said cutter having the driving and bearing elements applied thereto.
Figure 4:
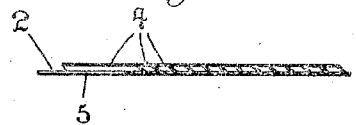
Fig. 4 represents a vertical section taken in the plane of the line IV—IV of Fig. 3.
Figure 6:
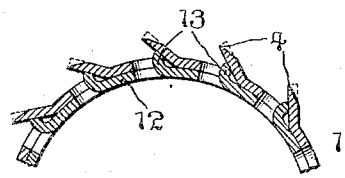
Fig. 6 represents an enlarged detail section of the cutter showing a means of reinforcing the cutter blades.

In the embodiment shown in Figs. 1 to 9 inclusive the rotatable cutter comprises a tube 1 shown cylindrical in the present instance, which tube is produced as follows:—

A blank 2 of rhomboidal form is cut from a piece of sheet metal 3 and it is struck up by stamping, rolling or otherwise to produce pencil sharpening blades 4, either continuous or interrupted, which project outwardly from the surface of the blank. These sharpening blades are formed parallel to the diagonal side edges 5 so that when the blank is curved into its tubular form, the sharpening blades will be arranged spirally and exteriorly thereon, with the abutting side edges of the blank meeting at a point between two sharpening blades. These side edges may be permanently united by any well known or approved means.

In the embodiment represented in Figs. 10 to 18 inclusive the blank 6 is of rectangular form and is cut from a piece of sheet metal 7 and is struck up by stamping, rolling or otherwise to produce pencil sharpening blades 8, either continuous or interrupted, which project outwardly from the surface of the blank. These sharpening blades are formed parallel to the side edges 9 so that when the blank is curved into its tubular form the straight exterior sharpening blades will be arranged longitudinally thereon with the abutting side edges of the blank meeting at a point between two sharpening blades. These side edges may be permanently united by any well known or approved means.

In both of the embodiments herein shown and described, one end of the cutter may be provided with an element 10 forming a shaft bearing and the other end of the cutter may be provided with an element, in the present instance a gear 11, forming both a shaft bearing and a driving element.

If so desired, the cutter blades may be suitably reinforced. In the form shown in Figs. 6 and 15, the reinforcement is a tube 12 snugly fitted within the cutter and provided with outwardly turned ribs 13 corresponding in number to the number of pencil sharpening blades, which ribs project outwardly along the under sides of said blades.

Figure 7:
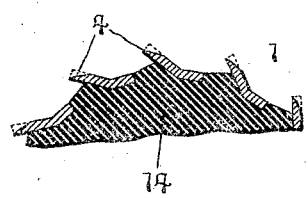
Fig. 7 represents a similar view showing another means of reinforcing the cutter blades.
Figure 8:
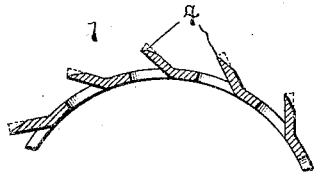
Fig. 8 represents a similar view of the cutter without any reinforcement.
Figure 9:
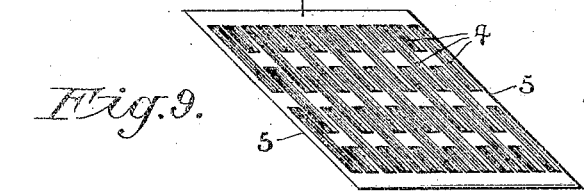
Fig. 9 represents a view similar to Fig. 3, showing interrupted blades.
Figure 10:
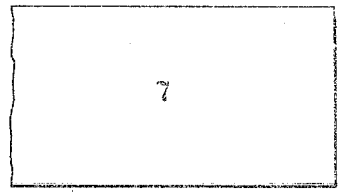
Fig. 10 represents a plan view of a piece of sheet metal from which a blank for a modified form of cutter is taken.
Figure 11:
Fig. 11 represents an edge view of the same.
Figure 12:
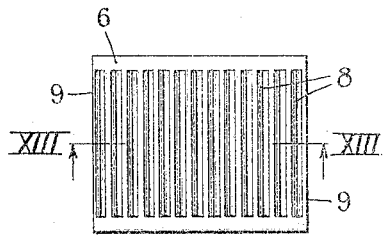
Fig. 12 represents a plan view of the blank struck up to produce the pencil sharpening blades.
Figure 14:
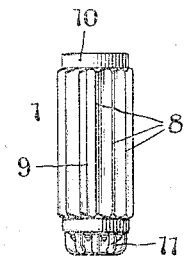
Fig. 14 represents a side view of the cutter, the pencil sharpening blades being shown arranged straight and exteriorly thereon and having the driving and bearing elements applied thereto.
Figure 13:
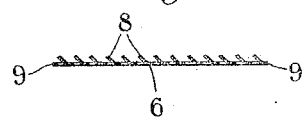
Fig. 13 represents a vertical section taken in the plane of the line XIII—XIII of Fig. 12.
Figure 15:
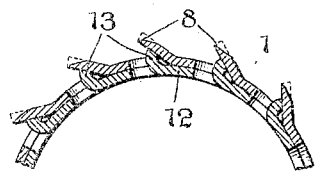
Fig. 15 represents an enlarged detail section showing a means of reinforcing the cutter and blades.
Figure 16:
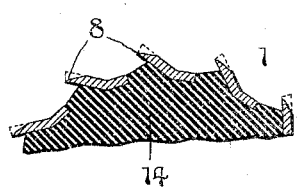
Fig. 16 represents a similar view showing another means of reinforcing the cutter blades.
Figure 17:
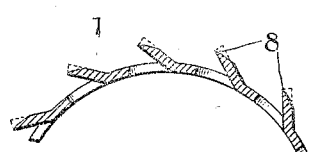
Fig. 17 represents a similar view of the cutter without any reinforcement.
Figure 18:
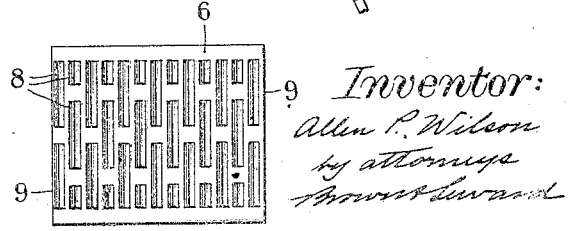
Fig. 18 represents a view similar to Fig. 12 showing interrupted blades.

Another form of reinforcing means is disclosed in Figs. 7 and 16 in which the reinforcement is a suitable composition 14, such for instance as hard rubber or wax composition.

It is to be understood that the curving of the blank into its tubular form may be accomplished by any suitable devices of a well known or approved type.

It is also to be understood that after the tube has been completed it may be hardened by any well known or approved process and if so desired, the exterior sharpening blades may be suitably sharpened.

What I claim is:

1. The method of producing rotatable sheet metal cutters for pencil sharpeners comprising striking up a sheet metal blank to produce one or more pencil sharpening blades, curving the blank into a tube having the blade or blades arranged exteriorly thereon, uniting the meeting edges of the blank, and providing the cutter with a driving element.

2. The method of producing rotatable sheet metal cutters for pencil sharpeners comprising striking up a sheet metal blank to produce one or more pencil sharpening blades, curving the blank into a tube having the blade or blades arranged exteriorly thereon, uniting the meeting edges of the blank and applying a reinforcement to the undersides of said blades.

3. The method of producing rotatable sheet metal cutters for pencil sharpeners comprising striking up a sheet metal blank to produce one or more pencil sharpening blades, curving the blank into a tube having the blade or blades arranged exteriorly thereon, uniting the meeting edges of the blank, applying a reinforcement to the undersides of said blades, and providing the cutter with a driving element.

In testimony that I claim the foregoing as my invention, I have signed my name this eleventh day of April, 1919.

ALLEN P. WILSON.